(12) United States Patent
Uhrich et al.

(10) Patent No.: US 11,300,064 B2
(45) Date of Patent: Apr. 12, 2022

(54) METHODS AND SYSTEMS FOR AN AFTERTREATMENT SYSTEM

(71) Applicant: Ford Global Technologies, LLC, Dearborn, MI (US)

(72) Inventors: Michael James Uhrich, Wixom, MI (US); Giovanni Cavataio, Dearborn, MI (US); William Charles Ruona, Farmington Hills, MI (US); Joseph Lyle Thomas, Farmington Hills, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/918,720

(22) Filed: Jul. 1, 2020

(65) Prior Publication Data
US 2022/0003179 A1    Jan. 6, 2022

(51) Int. Cl.
| | |
|---|---|
| *F02D 41/02* | (2006.01) |
| *F01N 3/20* | (2006.01) |
| *F01N 3/10* | (2006.01) |
| *F01N 11/00* | (2006.01) |
| *F02D 41/04* | (2006.01) |
| *F02D 41/14* | (2006.01) |
| *F02D 41/06* | (2006.01) |

(52) U.S. Cl.
CPC ......... *F02D 41/0275* (2013.01); *F01N 3/101* (2013.01); *F01N 3/208* (2013.01); *F01N 11/007* (2013.01); *F02D 41/042* (2013.01); *F02D 41/065* (2013.01); *F02D 41/1439* (2013.01); *F02D 41/1454* (2013.01); *F01N 2560/06* (2013.01); *F01N 2610/02* (2013.01); *F02D 2200/0802* (2013.01)

(58) Field of Classification Search
CPC combination set(s) only.
See application file for complete search history.

(56) References Cited

U.S. PATENT DOCUMENTS

| | | | |
|---|---|---|---|
| 8,661,788 B2 | 3/2014 | Qi et al. | |
| 8,931,257 B2 | 1/2015 | Narayanaswamy et al. | |
| 9,163,543 B2 | 10/2015 | Cavataio et al. | |
| 2005/0217249 A1* | 10/2005 | Itoh | B01D 53/9409 60/286 |
| 2011/0035136 A1* | 2/2011 | Niimi | B60W 10/06 701/110 |
| 2011/0192144 A1* | 8/2011 | Yasui | F01N 3/208 60/276 |
| 2014/0144125 A1* | 5/2014 | Cavataio | F01N 3/101 60/274 |

(Continued)

FOREIGN PATENT DOCUMENTS

JP    2017515030 A    6/2017

*Primary Examiner* — Binh Q Tran
(74) *Attorney, Agent, or Firm* — Geoffrey Brumbaugh; McCoy Russell LLP

(57) ABSTRACT

Methods and systems are provided for an aftertreatment system. In one example, a system comprising a spark-ignited engine comprising a selective catalytic reduction device (SCR) arranged in an exhaust passage downstream of a catalyst, and an injector positioned to inject a reductant directly into the exhaust passage downstream of the catalyst subsequent an engine shut-off event.

17 Claims, 4 Drawing Sheets

(56) References Cited

U.S. PATENT DOCUMENTS

| | | | |
|---|---|---|---|
| 2015/0128564 A1* | 5/2015 | Upadhyay | F01N 3/2066 60/274 |
| 2015/0192047 A1* | 7/2015 | Toshioka | F01N 3/0842 422/111 |
| 2016/0258373 A1* | 9/2016 | Tanaka | F01N 9/00 |
| 2019/0218954 A1 | 7/2019 | Ragaller et al. | |

* cited by examiner

METHODS AND SYSTEMS FOR AN AFTERTREATMENT SYSTEM

FIELD

The present description relates generally to adjusting operation of a selective catalytic reduction device (SCR) in an exhaust passage of a spark-ignited engine.

BACKGROUND/SUMMARY

Emissions requirements are continuously becoming increasingly strict in an effort to combat climate change. Vehicle manufacturers are forced to improve aftertreatment and propulsion systems to decrease vehicle emissions. One such improvement includes engine shut-off events where the engine no longer receives fuel. Since diesel engines operate lean, aftertreatment systems therein may already be configured to treat $NO_x$ produced during lean conditions.

However, spark-ignited, gasoline engines may operate at or near stoichiometric, wherein $NO_x$ production is less than that in diesel engines. Thus, following an engine shut-off event, gasoline engines may be insufficiently equipped to reduce $NO_x$ without executing a rich regeneration of a catalyst. In one example, gasoline engines are configured to enrich exhaust gas during an engine restart subsequent a shut-off event to decrease $NO_x$ emissions. However, this results in increased fuel consumption and detracts from some of the benefits of the shut-off event.

In one example, the issues described above may be addressed by a system comprising an exhaust passage fluidly coupled to a spark-ignited engine, the exhaust passage comprising a three-way catalyst upstream of a selective catalytic reduction device; and a reductant injector positioned to inject reductant into the exhaust passage between the three-way catalyst and the selective catalytic reduction device in response to an ammonia load of the selective catalytic reduction device falling below a threshold load. In this way, an efficiency of the shut-off event is not negated due to $NO_x$ production during a subsequent engine restart.

As an example, the SCR is arranged in a far underbody of the vehicle. The SCR may be configured to treat $NO_x$ during lean engine operating conditions when the catalyst is unable. In one example, the catalyst is a three-way catalyst (TWC), wherein the TWC may be leaned during the engine shut-off event. If exhaust gas downstream of the TWC is detected to be lean, then the TWC may be chemically less reactive to $NO_x$ during a subsequent engine. However, if conditions of the SCR are suitable for $NO_x$ reduction, wherein the conditions include an SCR temperature within a desired range, oxygen being delivered thereto, and an ammonia load greater than a threshold load, then the engine may be restarted following the engine shut-off without operating rich. By doing this, a fuel savings of the engine shut-off event may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
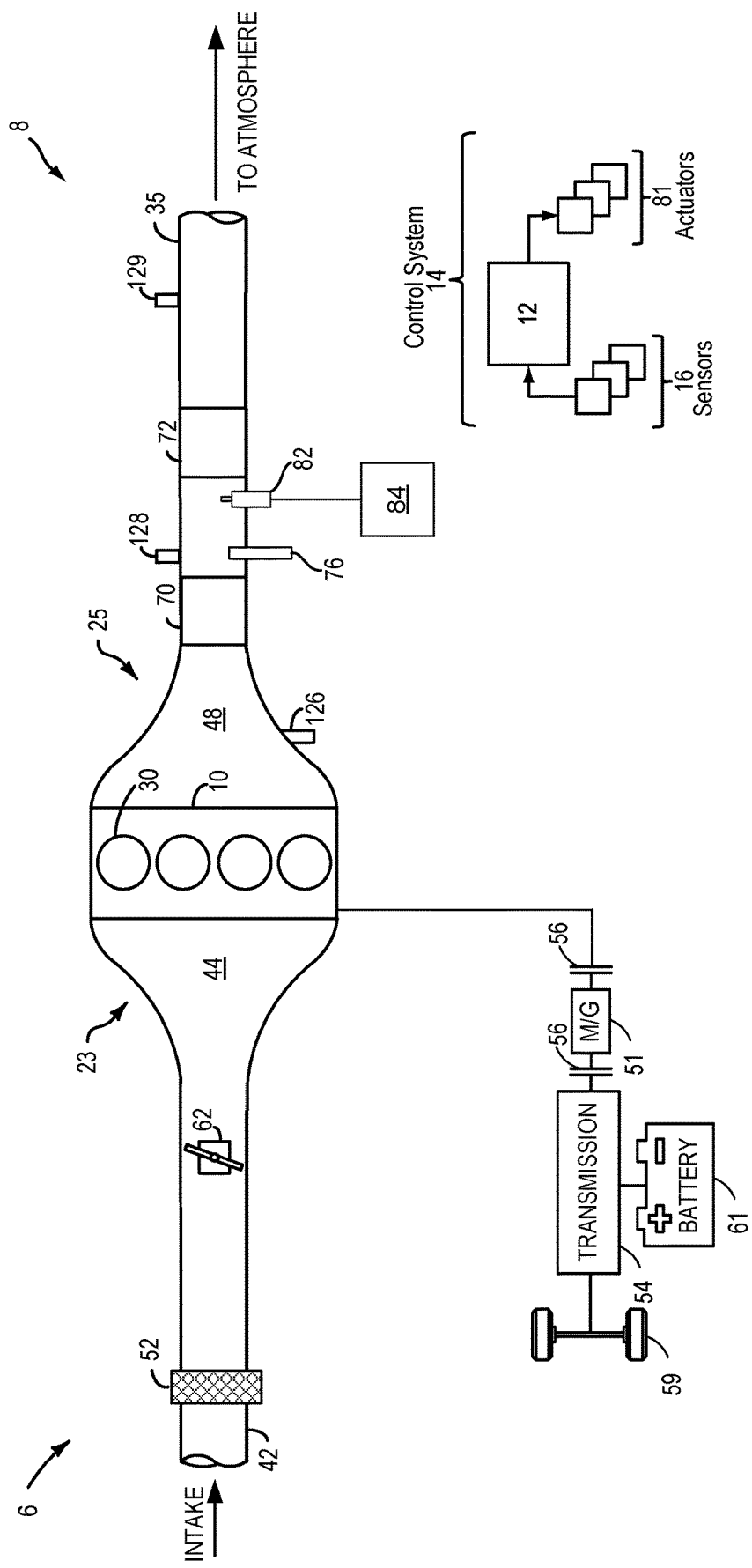
FIG. 1 illustrates a schematic of an engine included in a hybrid vehicle.
Figure 2:
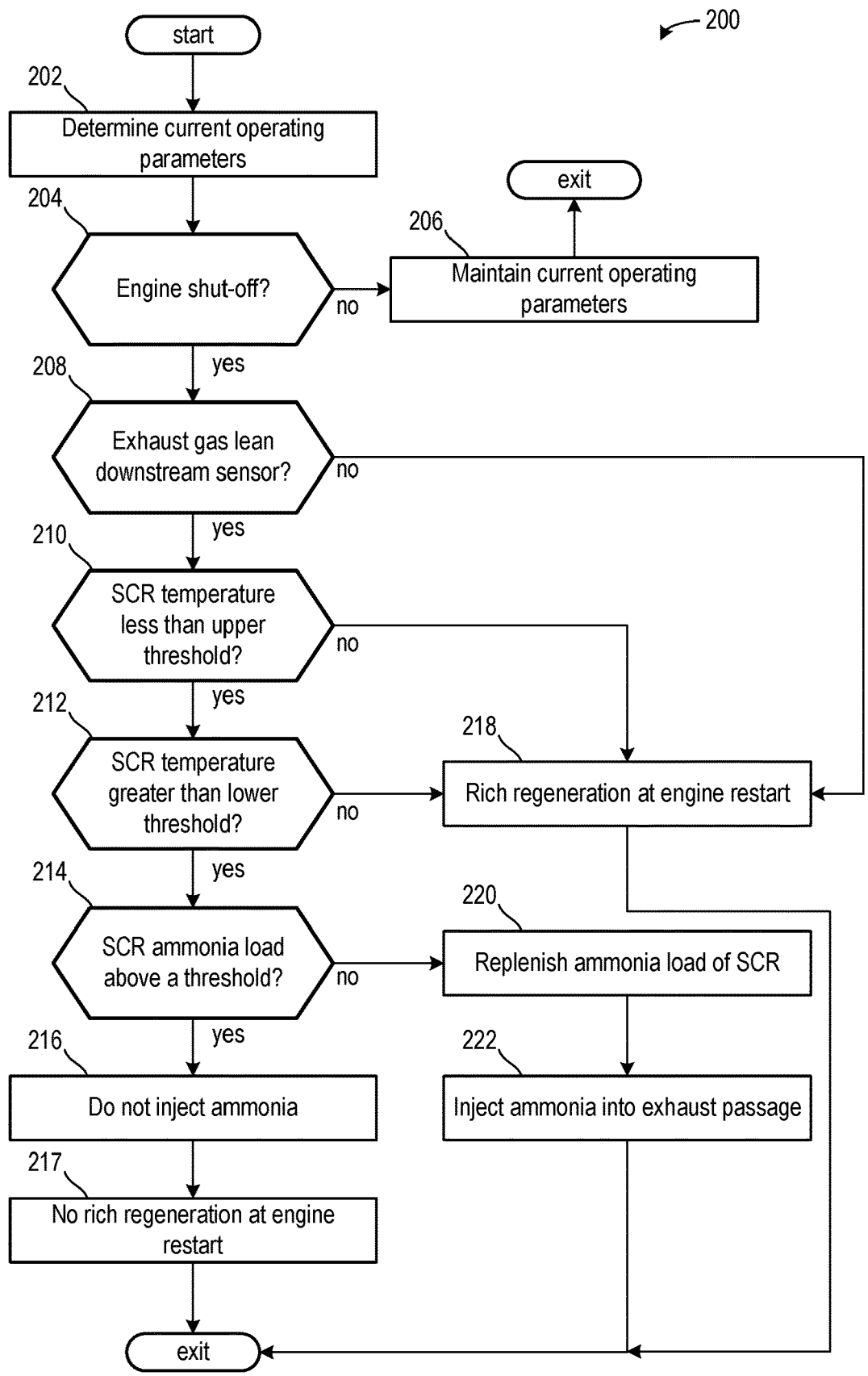
FIG. 2. Illustrates a method for adjusting engine restart conditions subsequent an engine shut-off event in response to conditions of an SCR.
Figure 3:
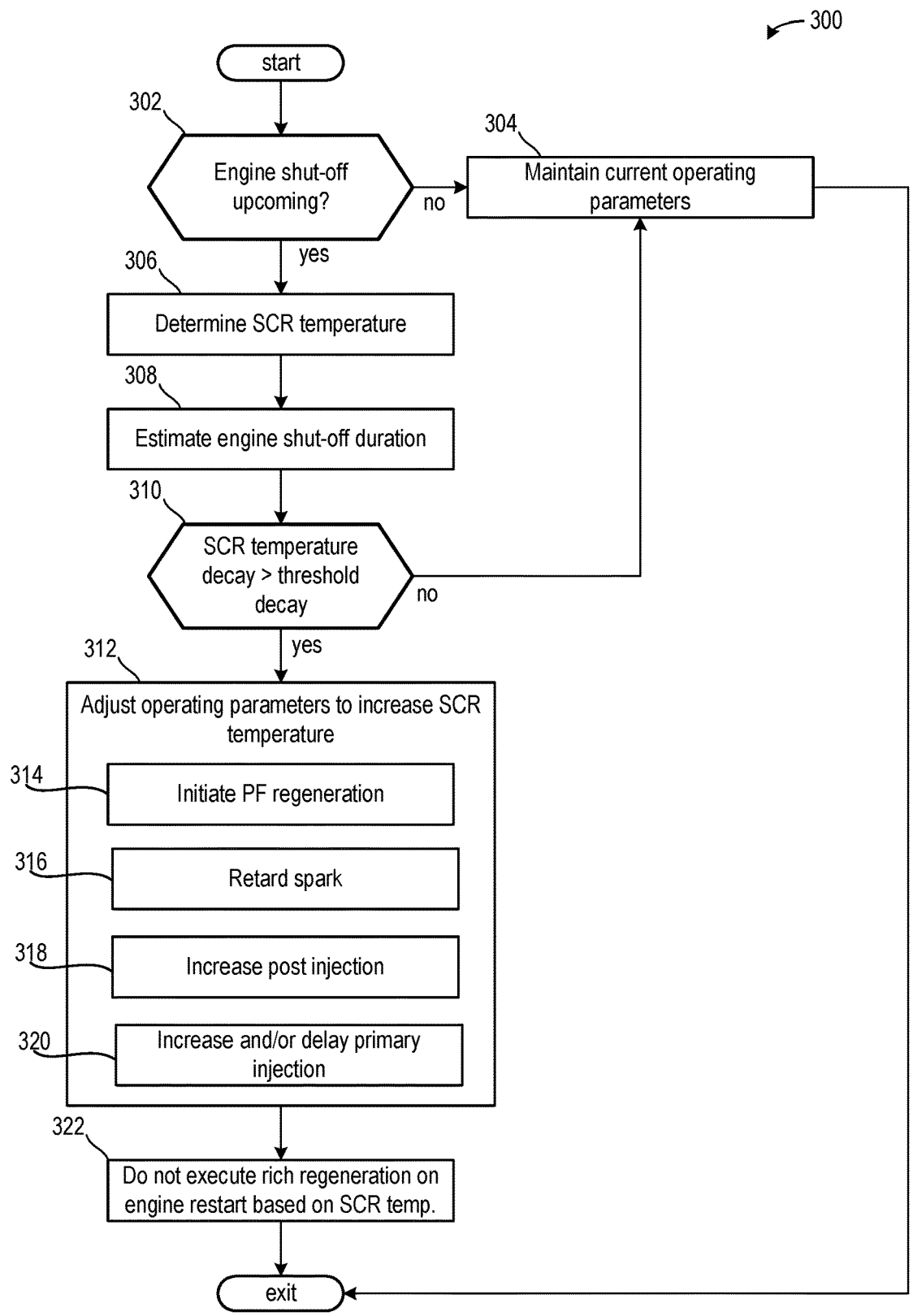
FIG. 3 illustrates a method for prophylactically adjusting engine operating conditions prior to an engine shut-off event to improve SCR conditions to treat $NO_x$ during the engine shut-off event.
Figure 4:
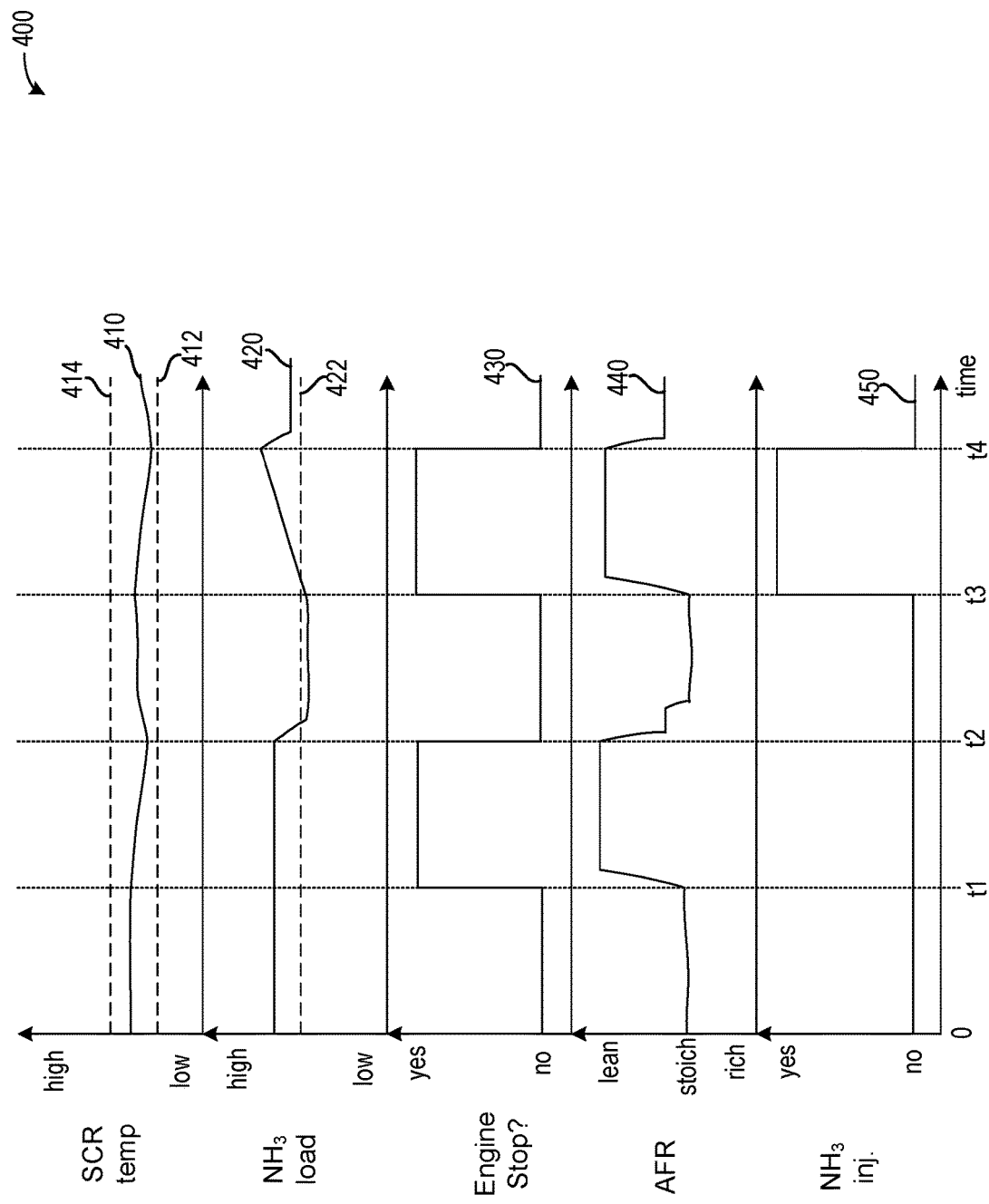
FIG. 4 illustrates a prophetic engine operating sequence illustrating engine operating parameters adjustments surrounding an engine shut-off event in relation to conditions of the SCR.

The following description relates to systems and methods for an SCR in an exhaust passage of a spark ignited engine. In one example, the SCR is arranged as a most downstream aftertreatment device in an exhaust passage of the spark ignited engine as illustrated in FIG. 1. FIGS. 2 and 3 illustrate methods for adjusting operating conditions in response to an engine shut-off event and conditions of the SCR. FIG. 4 illustrates a prophetic engine operating sequence for performing a reductant injection in response to an ammonia load of the SCR being less than a threshold ammonia load.

In one example, at the expense of fuel economy when a catalyst has been positioned lean of stoichiometry, a rich perturbation, such as catalyst regeneration, may be desired to reduce the tailpipe $NO_x$ during an engine restart following a lean engine event, such as an engine shut-off event. Installing an SCR at the furthermost catalyst in a gasoline engine exhaust system may eliminate a frequency in which the rich perturbation during the engine restart is demanded. Factors for efficient SCR function are $NH_3$ stored, oxygen delivered, and SCR brick temperature (>200 C and <350 C). Efficient SCR function may include 90% or greater reduction of $NO_x$ flowing through the SCR. That is to say, the temperature, ammonia load, and oxygen flow are not rate limiting factors during efficient SCR reduction of $NO_x$.

When these factors are met NOx can be converted to nitrogen ($N_2$) and water ($H_2O$). Therefore, contrary to conventional regeneration strategy, when the engine is restarted from an oxygen saturated state, and $NH_3$ is stored on the SCR, running the engine lean of stoichiometry (instead of rich) can convert $NO_x$ across the SCR and reduce fuel consumption. Current diesel technology uses an ammonia model to track the amount of $NH_3$ stored on the SCR. If the factors (temperature, $NH_3$, $O_2$) are met, rich engine restart may not be executed, thereby increasing a fuel savings associated with the engine shut-off event. However, if the ammonia model (or TP $NO_x$ sensor) indicates an ammonia load of the SCR is too low, the controller may execute a rich regeneration strategy to maintain tailpipe $NO_x$ below acceptable limits and deliver $NH_3$ to the SCR. However, this may be circumvented in examples where an injector is positioned to inject ammonia into the exhaust passage toward the SCR. As such, the injector may be activated and ammonia in the SCR may be replenished without operating the engine rich during the restart, thereby increasing a fuel savings.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include a plurality of emission control devices 70 and 72 mounted in a close-coupled or far vehicle underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

In one example, the emission control device 70 is a first emission control device arranged upstream of a second emission control device 72 relative to a direction of exhaust gas flow. A sensor 76 may be arranged at a junction between the first emission control device 70 and the second emission control device 72. The sensor 76 may be an EGR, HEGO, lambda, or other type of exhaust gas sensor. Additionally or alternatively, a temperature sensor 128 may also be arranged between the first emission control device 70 and the second emission control device 72. Feedback from either of the sensor 126 or the temperature sensor 128 may indicate a temperature and oxygen content of exhaust gas upstream of the second emission control device 72.

In one example, the first emission control device 70 is shown in a close-coupled position and the second emission control device 72 is shown in a vehicle far-underbody position. As such, exhaust gas temperatures may be hotter at the first emission control device 70 than the second emission control device 72. In one example, exhaust gas temperatures are 30% cooler at the second emission control device 72 than the first emission control device 70. Additionally or alternatively, exhaust gas temperatures are 50% cooler at the second emission control device 72 than the first emission control device 70.

In one example, the first emission control device 70 is a catalyst, such as a three-way catalyst (TWC), and the second emission control device 72 is a selective catalytic reduction device (SCR). In one example, the engine 10 is a gasoline engine comprising a spark plug or other ignition device, wherein the TWC 70 is configured to reduce and oxidize various compounds by being maintained near a stoichiometric ratio, which may be controlled via engine operation (e.g., rich or lean). During an engine shut-off event, the air/fuel ratio may leaned, resulting in a leaning of the TWC. If the engine shut-off event duration is greater than a threshold duration, then lean air may begin to flow passed the TWC to the second emission control device. Herein, the second emission control device 72 is an SCR 72, wherein oxygen flowing to the SCR may indicate one of a plurality of conditions met for SCR to treat $NO_x$. As will be described in greater detail below, when conditions for the SCR are met to treat $NO_x$, the engine may be restarted without executing a TWC regeneration strategy, wherein the TWC regeneration strategy includes operating the engine rich to return the TWC closer to stoichiometric.

An injector 82 may receive reductant from a reductant reservoir 84. As shown, the injector 82 is positioned to inject directly into the exhaust passage between the TWC 70 and the SCR 72. More specifically, the injector 82 is positioned downstream of the sensor 76 such that an injection of reductant may not impinge onto the sensor 76. In one example, the injector 82 is a urea injector positioned to inject into a portion of the exhaust passage 35 upstream of the SCR 72 and downstream of the PF 70. Additionally or alternatively, the injector 82 may be configured to inject a mixture of water and ammonia, known to those of ordinary skill in the art as diesel exhaust fluid, which may be stored in the reservoir 84.

While the example of FIG. 1 illustrates only the TWC and the SCR, it will be appreciated that other aftertreatment devices may be arranged between the TWC and the SCR. For example, there may be arranged a particulate filter (PF) between the TWC and the SCR.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

In one example, the controller 12 may be configured to signal to an actuator of the injector 82 in response to one or more of a temperature or an ammonia load of the SCR 72 during an engine shut-off event. For example, the engine 10 may be shut-off, which may include cutting a fuel supply to the engine 10 such that combustion no longer occurs. Events including an engine shut-off may include a fuel shut-off event (e.g., a coasting event) and a start/stop event along with other similar events. The fuel shut-off event may be implemented during a coasting and/or braking event with a duration greater than a first threshold duration. The start/stop may be implemented during a vehicle stop with a duration greater than a second threshold duration, which may be equal to or different than the first threshold duration. During such an event, exhaust gases may become lean (e.g., lambda greater than 1), which may result in an over-leaning of the TWC 70, such that reduction of $NO_x$ during a subsequent engine restart may not be favored at the TWC 70. The SCR 72 may be configured to treat $NO_x$ when its temperature is within a desired temperature range, when it comprises an ammonia load above a threshold ammonia load, wherein the threshold load may be a dynamic value estimated based on an estimated amount of $NO_x$ to be produced during the engine shut-off event, and when a sufficient amount of oxygen is flowing thereto. For example, the threshold ammonia load may increase in response to the estimated amount of $NO_x$ to be produced increases, wherein $NO_x$ production may increase in response to lower temperature and higher AFR. In one example, an amount of ammonia injected may be proportional to the estimated amount of $NO_x$ to be produced.

Thus, in one example, FIG. 1 illustrated an example of an engine comprising a plurality of cylinders, each of which comprises a gasoline injector and a spark plug. The engine may be arranged in a hybrid vehicle, wherein the engine may include one or more fuel saving features including DFSO and start/stop. An SCR device is arranged in an exhaust passage of the engine, wherein the SCR device is configured to treat $NO_x$ emissions of the engine during a subsequent engine restart following an engine shut-off event, which may reduce fuel consumption. By doing this, $NO_x$ emissions following the engine shut-off event may be reduced even if the TWC is overly leaned. That is to say, previous examples included operating the engine rich following the engine shut-off event to return the TWC to a more stoichiometric condition, which increases fuel consumption and negates some of the fuel economy benefits of the shut-off event. By arranging the SCR in a gasoline engine exhaust passage, fuel injections to decrease the AFR to rich to execute a rich regeneration of the TWC following the shut-off event may be more frequently avoided during conditions where the SCR is configured to reduce $NO_x$, thereby increasing fuel efficiency. During some shut-off events, when conditions of the SCR are not suitable for reducing $NO_x$, the injector is activated and begins injecting ammonia into the exhaust passage to increase an ammonia load of the SCR to avoid the rich regeneration upon a subsequent engine restart. These conditions may include when an ammonia load of the SCR is below a threshold load or when the SCR temperature is less than a threshold temperature. Alternatively, if the SCR temperature is outside of a desired range (e.g., too hot or too cold) or if oxygen is not flowing to the SCR, then a rich regeneration may be executed during the subsequent engine restart.

Turning now to FIG. 2, it shows a method 200 for determining whether to regenerate an SCR during an engine shut-off event. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining, estimating, and measuring current operating parameters. The current operating parameters may include one or more of manifold vacuum, throttle position, engine temperature, engine speed, and air/fuel ratio.

The method 200 begins at 204, which includes determining if the engine is shut-off. The engine may be shut-off during a start/stop event, a fuel shut-off event, or other vehicle coasting or stopping event where an accelerator pedal is not being depressed. During the shut-off event, fuel injections may not be delivered to the engine and an air/fuel ratio may be leaned such that air flows through the exhaust passage.

If the engine shut-off is not occurring, then the method 200 proceeds to 206, which includes maintaining current engine operating parameters and does not adjust conditions to adjust an operating state of a TWC or an SCR.

If the engine shut-off is occurring, then the method 200 proceeds to 208, which includes determining if an exhaust gas air/fuel ratio is lean at a downstream exhaust gas sensor. In one example, if the exhaust gas sensor 76 senses a lean air/fuel ratio (e.g., lambda value greater than 1.0), then the exhaust gas may be lean and a condition of the TWC may be substantially lean, thereby indicating less favorable conditions in the TWC to reduce $NO_x$ along with sufficient oxygen flow to the SCR for $NO_x$ reduction during a subsequent engine restart following the engine shut-off event. If the exhaust gas is not lean, then oxygen flow to the SCR may be insufficient, and the method 200 proceeds to 218, which includes signaling to executed a rich regeneration at a subsequent engine restart following the engine shut-off event.

If the exhaust gas is lean, then the SCR may be receiving a sufficient amount of air to reduce $NO_x$, and the method 200 proceeds to 210, which includes determining if an SCR temperature is less than an upper threshold temperature. In one example, the upper threshold temperature is an upper temperature of a temperature range in which the SCR may be more favored at reducing $NO_x$. As such, if the SCR temperature is not less the upper threshold temperature, then the SCR may be too hot to efficiently treat $NO_x$. If the SCR temperature is not less than the upper threshold temperature, then the method 200 may proceed to 218 to signal a rich engine restart.

In one example, the method 200 may inject ammonia following determination of the SCR being too hot. Additionally or alternatively, an air injector may be positioned to flow air to the SCR. In one example, the injector 82 may be a multi-purpose injector comprising a plurality of outlet nozzles wherein at least one of which is configured to inject reductant and another of which is configured to inject air. Air may be provided via one or more components already arranged on board, including but not limited to a compressor. Additionally or alternatively, air may be provided by an air compression system not used during combustion. That is to say, ammonia may be injected, even when the SCR ammonia load is greater than a threshold load, as a measure to decrease the SCR temperature. Additionally or alternatively, air may be injected to decrease the SCR temperature and/or to provide a sufficient amount of air flow to the SCR. In one example, ammonia may only be injected to cool the SCR if the SCR is not fully saturated with ammonia in order to block ammonia flowing through a tail pipe to an atmosphere.

In some examples, the method may further include determining a difference between the SCR temperature and the upper threshold temperature. If the difference is less than a threshold difference, then it may be determined that the SCR temperature will decrease to a temperature less than the upper threshold temperature during the engine shut-off and ammonia may optionally not be injected.

If the SCR temperature is less than the upper threshold temperature, with or without the ammonia injection, then the method 200 proceeds to 212, which includes determining if the SCR temperature is greater than a lower threshold temperature. The lower threshold temperature may correspond to a lower temperature of the temperature range of the SCR. That is to say, the lower threshold temperature and the upper threshold temperature may represent extreme ends of a temperature range in which the SCR is most efficient at reducing $NO_x$. If the SCR temperature is not greater than the lower threshold temperature, then the method 200 may proceed to 218 to signal a rich regeneration during a subsequent engine restart. As such, 218 limits $NO_x$ production during the engine restart by operating rich while simultaneously returning a condition of the TWC to a more stoichiometric condition (e.g., a rich regeneration).

If the SCR temperature is above the lower threshold such that the SCR temperature is between the lower threshold and the upper threshold, then the method 200 proceeds to 214 to determine if the SCR ammonia load is above a threshold load. The threshold load may be based on a lowest ammonia load of the SCR in which the SCR may efficiently reduce $NO_x$ to desired levels. As one example, the threshold load is equal to 10% or less saturation of the SCR with ammonia. However, the threshold load may alternatively be any load less than full saturation of the SCR. As such, an ammonia injection may occur so long as the SCR comprises space sufficient to store the ammonia. If the SCR ammonia load is not less than the threshold load, then the method 200 proceeds to 216, which includes not injecting ammonia or fuel. As such, the SCR may be conditioned to efficiently treat $NO_x$ during the engine restart and the method 200 proceeds to 217 which includes not executing the rich regeneration at the engine restart. In one example, the restart may include a lean operation of the engine (e.g., lambda between 1.2 to 1.5) to provide sufficient oxygen to the SCR to treat $NO_x$.

If the SCR ammonia load is not greater than the threshold ammonia load, then the method 200 proceeds to 220, which includes replenishing the ammonia load of the SCR. As such, the method 200 proceeds to 222, which includes injecting ammonia into the exhaust passage during the engine shut-off event so that a sufficient amount of ammonia is present for the SCR to reduce $NO_x$ during the subsequent engine restart.

Turning now to FIG. 3, it shows a method 300 for prophylactically adjusting engine operating conditions prior to an engine shut-off event so that the SCR may be conditioned to treat $NO_x$ during an engine restart following the engine shut-off event.

The method 300 begins at 302, which includes determining if an engine shut-off event is upcoming. In one example, the engine shut-off event may be upcoming based on feedback from one or more of a navigation system, a pedal position sensor, a proximity sensor, and a throttle position sensor. If it is determined based on the feedback that the engine shut-off event is not upcoming, then the method proceeds to 304, which includes maintaining current engine operating parameters. Furthermore, the method 300 may not adjust engine operating conditions to adjust a condition of the SCR to treat $NO_x$.

If an engine shut-off event is upcoming, which may be determined for example based on feedback from the navigation system indicating a stop is upcoming due to a traffic light, then the method 300 proceeds to 306 to determine an SCR temperature, as described in method 200.

The method 300 proceeds to 308, which includes estimating an engine shut-off duration. The engine shut-off duration may be estimated based on feedback from the navigation system along with feedback from proximity sensors. For example, the engine shut-off duration, which may be a DFSO, may be estimated to be longer in response to feedback from the navigation system indicating an uphill is not upcoming. As such, an acceleration may be unnecessary and the engine shut-off event may be prolonged. Additionally or alternatively, the engine shut-off may be estimated to be shorter is the proximity sensor senses a vehicle ahead moving away from the proximity sensor.

The method 300 proceeds to 310, to determine if an SCR temperature decay is greater than a threshold decay. The threshold decay may be a dynamic value adjusted based on a current SCR temperature and the estimated engine shut-off duration. For example, if the SCR temperature is higher, then the threshold decay may be lower. Additionally or alternatively, if the engine shut-off duration is higher, then the threshold decay is higher. The SCR temperature decay may be based on an estimated temperature reduction of the SCR during the engine shut-off event. If the SCR temperature decay is not greater than the threshold decay, then the SCR temperature may decrease during the engine shut-off event but not fall to a temperature below the lower threshold temperature. As such, the method 300 proceeds to 304 to maintain current operating parameters. That is to say, a combination of the current SCR temperature and the estimated engine shut-off duration may be such that the SCR temperature may remain within a desired temperature range without adjustments to an engine operating conditions prior to the engine shut-off event.

Thus, if the SCR temperature decay is greater than the threshold decay, then the SCR temperature may fall to a temperature less than the lower threshold temperature during the upcoming engine shut-off event, and no longer treat $NO_x$ to desired amounts. The method 300 proceeds to 312, which includes adjusting engine operating conditions to increase the SCR temperature. Adjusting the engine operating conditions may include initiating a PF regeneration at 314, retarding spark at 316, increasing a post-injection amount at 318, and/or increasing a primary injection amount at 320.

By initiating the PF regeneration, wherein the PF is upstream of the SCR relative to a direction of exhaust gas flow, latent heat from the regeneration may heat the SCR temperature such that its temperature rises and a decay during the engine shut-off would no longer decrease the SCR temperature to a temperature less than the lower threshold temperature. Retarding spark at 316 and/or increasing a post-injection amount and/or primary injection amount may result in a greater amount of combustion occurring in the exhaust passage, which may result in increasing the SCR temperature.

It will be appreciated that prior to the engine shut-off event, the SCR temperature may increase over the upper threshold temperature with little to no penalties as the TWC may still be conditioned to reduce $NO_x$. As such, the SCR temperature may be increased based on the predicted SCR temperature decay during the shut-off event. That is to say, in one example, the method 300 proactively increases the SCR temperature prior to the engine shut-off event so that the SCR may stay hot enough to efficiently treat $NO_x$ during a subsequent engine restart without executing a rich regeneration during the engine restart. The adjustments to the engine operating parameters may be intrusive in some examples such that the adjustments are not based on current driver demand.

The method 300 proceeds to 322, which includes not executing a rich regeneration on an engine restart following the engine shut-off event based on an SCR temperature. In one example, a flag may be set to not restart an engine rich based on at least the SCR temperature following an engine stop where the method 200 of FIG. 2 may be executed.

In some examples, initiation of the PF regeneration may result in less oxygen flow to the SCR. As such, a further adjustment may include setting a flag to initiate an air injector to inject air to the SCR device during and/or after the engine shut-off event to provide sufficient oxygen flow to the SCR to execute Turning now to FIG. 4, it shows a graph 400 illustrating a prophetic engine operating sequence detailing engine operating adjustments in response to conditions of the SCR during an engine stop. Plot 410 illustrates an SCR temperature with dashed line 412 illustrating the lower threshold temperature and dashed line 414 illustrating the upper threshold temperature. Plot 420 illustrates an $NH_3$ load and dashed line 422 illustrates a threshold $NH_3$ load. Plot 430 illustrates if an engine stop is occurring. Plot 440 illustrates an exhaust gas air/fuel ratio. Plot 450 illustrates if an ammonia injection is occurring.

Prior to t1, the SCR temperature (plot 410) is between the lower threshold (dashed line 412) and the upper threshold (dashed line 414). The ammonia load (plot 420) is above the threshold ammonia load (dashed line 422). An engine stop is not occurring (plot 430), resulting in little to no consumption of the ammonia. The exhaust air/fuel ratio (plot 440) is similar to stoichiometric (e.g., lambda equal to 1.0). An ammonia injection (plot 450) is not occurring due to the ammonia load being above the threshold ammonia load.

At t1, an engine stop is occurring. As such, fuel to the engine is cut-off and the AFR increases to a lean AFR. Between t1 and t2, the SCR temperature decreases as air flows thereto. However, the SCR temperature remains between the lower and upper threshold temperatures.

At t2, the engine stop is completed with the ammonia load being greater than the threshold load. As such, the engine restart at t2 does not include a rich regeneration of the TWC as the SCR is conditioned to reduce $NO_x$. In this way, the engine may be operated slightly lean to provide a sufficient amount of oxygen to the SCR. Between t2 and t3, the engine receives fuel and combusts slightly lean for an initial period, which increases the SCR temperature as the SCR reduces $NO_x$, as indicated via the reduction in ammonia load to a load below the threshold load. The engine may be switched to closer to stoichiometric following the initial period, wherein the initial period is based on an amount of time to return the TWC to a closer to stoichiometric condition. At t3, an engine stop occurs. Due to the ammonia load being less than the threshold ammonia load, an ammonia injection occurs. In some examples, the ammonia injection may occur prior to the engine shut-off event.

Between t3 and t4, the SCR temperature decreases due to the lean exhaust gas and the ammonia injection. The ammonia load of the SCR increases in preparation of the engine restart in combination with the TWC being overly oxidized to reduce $NO_x$. As such, the engine restart at t4 may not include a rich engine restart.

In the example of FIG. 4, ammonia is injected during the entirety of the engine shut-off event to ensure a sufficient amount of ammonia is available for reducing $NO_x$. However, in some examples, an amount of ammonia injected may be based on one or more of an estimated $NO_x$ production during the engine shut-off event and a difference between the ammonia load and the threshold ammonia load. For example, more ammonia may be injected as the difference increases or as the estimated $NO_x$ production increases. Alternatively, less ammonia may be injected in response to the difference being relatively low or as the estimated $NO_x$ production decreases.

At t4, the engine shut-off event is complete and the ammonia injection is terminated. After t4, the SCR temperature begins to increase as the engine receives fuel and is operated slightly lean. The ammonia load of the SCR decreases as the SCR reduces $NO_x$ during the engine restart subsequent the engine shut-off event.

In this way, a spark-ignited, gasoline engine may comprise an SCR arranged in an exhaust passage thereof. The SCR is configured to reduce $NO_x$ produced during a subsequent engine restart following an engine shut-off event, such as a start/stop, DFSO, or the like. As such, operating conditions of the SCR may be adjusted during or in anticipation of the engine shut-off event to promote sufficient $NO_x$ reduction during the engine restart. The technical effect of arranging the SCR in the exhaust passage of the spark-ignited engine is to reduce fuel consumption following the engine shut-off events to still reduce $NO_x$ without rich regenerating the TWC. A fuel savings accompanied with the engine shut-off event may be increased via arrangement and operation of the SCR.

An embodiment of a system, comprises an exhaust passage fluidly coupled to a spark-ignited engine, the exhaust passage comprising a three-way catalyst upstream of a selective catalytic reduction device, and a reductant injector positioned to inject reductant into the exhaust passage between the three-way catalyst and the selective catalytic reduction device in response to an ammonia load of the selective catalytic reduction device falling below a threshold load following an engine shut-off.

A first example of the system further comprises where the selective catalytic reduction device is arranged in a far underbody position.

A second example of the system, optionally including the first example, further includes where an exhaust gas sensor is arranged between the three-way catalyst and the selective catalytic reduction device.

A third example of the system, optionally including one or more of the previous examples, further includes where the spark-ignited engine comprises a start/stop feature.

An embodiment of a method, comprises following a lean operation of a spark-ignited engine, blocking a rich engine restart in response to a temperature of a selective catalytic reduction device being within a desired range, an oxygen flow being above a threshold oxygen flow, and a reductant load being greater than a threshold load.

A first example of the method further includes where the lean operation comprises a start/stop or a fuel shut-off event.

A second example of the method, optionally including the first example, further includes where the rich engine restart is selected in response to the oxygen flow being less than or equal to the threshold oxygen flow or the temperature of the selective catalytic reduction device being outside the desired range.

A third example of the method, optionally including one or more of the previous examples, further includes injecting reductant via a reductant injector in response to the reductant load not being greater than the threshold load.

A fourth example of the method, optionally including one or more of the previous examples, further includes initiating the rich engine restart subsequent the lean operation in response to the temperature of the temperature of the selective catalytic reduction device being outside the desired range or the oxygen flow being less than the threshold oxygen flow.

A fifth example of the method, optionally including one or more of the previous examples, further includes where restarting the engine subsequent the lean operation comprises restarting the engine with a lean air/fuel ratio, wherein the lean air/fuel ratio is less lean than an air/fuel ratio of the lean operation prior to restarting the engine.

A sixth example of the method, optionally including one or more of the previous examples, further includes where the spark-ignited engine is a gasoline engine.

An embodiment of a system, comprises a spark-ignited, gasoline engine, an exhaust passage fluidly coupled to the spark-ignited, gasoline engine, wherein the exhaust passage houses a three-way catalyst upstream of a selective catalytic reduction device relative to a direction of exhaust gas flow, and a controller with computer-readable instructions stored on non-transitory memory thereof that when executed enable the controller to inject ammonia during an engine shut-off event in response to an ammonia load of the selective catalytic reduction device being less than or equal to a threshold load.

A first example of the system, further includes where the instructions further enable the controller to estimate a temperature of the selective catalytic reduction device, wherein the controller signals to restart the spark-ignited, gasoline engine subsequent the engine shut-off event without a rich regeneration of the three-way catalyst in response to the ammonia load being greater than the threshold load and the temperature being with a threshold range.

A second example of the system, optionally including the first example, further includes where the instructions further enable the controller to restart the spark-ignited, gasoline engine subsequent the engine shut-off event with a lean air/fuel ratio.

A third example of the system, optionally including one or more of the previous examples, further includes where the instructions further enable the controller to inject ammonia in response to the selective catalytic reduction device temperature being above the threshold range and the ammonia load being less than a full saturation of the selective catalytic reduction device.

A fourth example of the system, optionally including one or more of the previous examples, further includes where an exhaust gas sensor arranged between the three-way catalyst and the selective catalytic reduction device.

A fifth example of the system, optionally including one or more of the previous examples, further includes where the instructions further enable the controller to restart the spark-ignited, gasoline engine subsequent the engine shut-off with the rich regeneration of the three-way catalyst in response to an air/fuel ratio detected at the exhaust gas sensor not being lean.

A sixth example of the system, optionally including one or more of the previous examples, further includes where the instructions further enable the controller to restart the spark-ignited, gasoline engine subsequent the engine shut-off with the rich regeneration of the three-way catalyst in response to the selective catalytic reduction device temperature being outside the threshold range.

A seventh example of the system, optionally including one or more of the previous examples, further includes where the engine shut-off event is a start/stop or a fuel shut-off event.

An eighth example of the system, optionally including one or more of the previous examples, further includes where ammonia is injected via an injector positioned to inject into a portion of the exhaust passage between the three-way catalyst and the selective catalytic reduction device, wherein the injector is fluidly coupled to a reservoir.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an exhaust passage fluidly coupled to a spark-ignited engine, the exhaust passage comprising a three-way catalyst upstream of a selective catalytic reduction device; and
a reductant injector positioned to inject reductant into the exhaust passage between the three-way catalyst and the selective catalytic reduction device; and
a controller with computer-readable instructions stored in non-transitory memory thereof that when executed enable the controller to:
inject reductant via the reductant injector in response to an ammonia load of the selective catalytic reduction device falling below a threshold load during an engine shut-off.

2. The system of claim 1, wherein the selective catalytic reduction device is arranged in a far underbody position.

3. The system of claim 1, wherein an exhaust gas sensor is arranged between the three-way catalyst and the selective catalytic reduction device.

4. The system of claim 1, wherein the spark-ignited engine comprises a start/stop feature, and wherein the spark-ignited engine is restarted lean following the engine shut-off in response to the ammonia load being greater than the threshold load during the engine shut-off.

5. A method, comprising:
during a lean operation of a spark-ignited engine, injecting reductant to a selective catalytic reduction device via a reductant injector during the lean operation in response to a reductant load not being greater than a threshold load; and
following the lean operation of the spark-ignited engine, blocking a rich engine restart in response to a temperature of the selective catalytic reduction device being within a desired range, an oxygen flow being above a threshold oxygen flow, and a reductant load being greater than a threshold load.

6. The method of claim 5, wherein the lean operation comprises a start/stop or a fuel shut-off event.

7. The method of claim 5, wherein the rich engine restart is selected in response to the oxygen flow being less than or equal to the threshold oxygen flow or the temperature of the selective catalytic reduction device being outside the desired range.

8. The method of claim 5, further comprising initiating the rich engine restart subsequent the lean operation in response to the temperature of the temperature of the selective catalytic reduction device being outside the desired range or the oxygen flow being less than the threshold oxygen flow.

9. The method of claim 5, wherein restarting the engine subsequent the lean operation comprises restarting the engine with a lean air/fuel ratio, wherein the lean air/fuel ratio is less lean than an air/fuel ratio of the lean operation prior to restarting the engine.

10. The method of claim 5, wherein the spark-ignited engine is a gasoline engine.

11. A system, comprising:
a spark-ignited, gasoline engine;
an exhaust passage fluidly coupled to the spark-ignited, gasoline engine, wherein the exhaust passage houses a three-way catalyst upstream of a selective catalytic reduction device relative to a direction of exhaust gas flow; and
a controller with computer-readable instructions stored on non-transitory memory thereof that when executed enable the controller to:
estimate a temperature of the selective catalytic reduction device during an engine shut-off event;
inject ammonia during the engine shut-off event in response to an ammonia load of the selective catalytic reduction device being less than or equal to a threshold load; and
restart the spark-ignited, gasoline engine with a lean air/fuel ratio subsequent the engine shut-off event without a rich regeneration of the three-way catalyst in response to the ammonia load being greater than the threshold load and the temperature being with a threshold range.

12. The system of claim 11, wherein the instructions further enable the controller to inject ammonia in response to the selective catalytic reduction device temperature being above the threshold range and the ammonia load being less than a full saturation of the selective catalytic reduction device.

13. The system of claim 11, further comprising an exhaust gas sensor arranged between the three-way catalyst and the selective catalytic reduction device.

14. The system of claim 13, wherein the instructions further enable the controller to restart the spark-ignited, gasoline engine subsequent the engine shut-off with the rich regeneration of the three-way catalyst in response to an air/fuel ratio detected at the exhaust gas sensor not being lean.

15. The system of claim 14, wherein the instructions further enable the controller to restart the spark-ignited, gasoline engine subsequent the engine shut-off with the rich regeneration of the three-way catalyst in response to the selective catalytic reduction device temperature being outside the threshold range.

16. The system of claim 11, wherein the engine shut-off event is a start/stop or a fuel shut-off event.

17. The system of claim 11, wherein ammonia is injected via an injector positioned to inject into a portion of the exhaust passage between the three-way catalyst and the selective catalytic reduction device, wherein the injector is fluidly coupled to a reservoir.

* * * * *